United States Patent [19]

Euler

[11] Patent Number: 4,572,023

[45] Date of Patent: Feb. 25, 1986

[54] AXIAL POSITION LOCK FOR TELESCOPING STEERING COLUMN

[75] Inventor: Richard W. Euler, LaPorte, Ind.

[73] Assignee: Allied Corporation, Morristown, N.J.

[21] Appl. No.: 593,447

[22] Filed: Mar. 26, 1984

[51] Int. Cl.[4] ............................................. B62D 1/18
[52] U.S. Cl. ....................................... 74/493; 74/531;
280/775; 403/370; 411/55
[58] Field of Search .................. 74/493, 531; 280/278,
280/279, 280, 775; 403/104, 370, 371, 374;
411/55

[56] References Cited

U.S. PATENT DOCUMENTS

| | | | |
|---|---|---|---|
| 777,399 | 12/1904 | Church | 411/55 |
| 2,331,996 | 10/1943 | Maurer | 74/551.1 |
| 2,430,524 | 11/1947 | Miller | 403/370 |
| 2,555,515 | 6/1951 | Slater | 403/104 X |
| 3,188,880 | 6/1965 | Caine | 74/493 |
| 3,434,368 | 3/1969 | Runkle | 74/531 X |
| 3,791,223 | 2/1974 | Treichel | 74/493 |
| 3,874,701 | 4/1975 | Soong | 403/374 X |
| 4,113,395 | 9/1978 | Pawsat et al. | 403/22 |
| 4,347,757 | 9/1982 | Martin | 74/493 |
| 4,418,582 | 12/1983 | Martin | 74/493 |

FOREIGN PATENT DOCUMENTS

| | | | |
|---|---|---|---|
| 0067101 | 12/1982 | European Pat. Off. | |
| 2828884 | 1/1980 | Fed. Rep. of Germany | |
| 396387 | 4/1909 | France | |
| 55-156766 | 12/1980 | Japan | |
| 59956 | 1/1912 | Switzerland | 403/370 |
| 195369 | 7/1923 | United Kingdom | 411/55 |
| 616126 | 1/1949 | United Kingdom | |
| 978145 | 12/1964 | United Kingdom | |
| 1042560 | 9/1966 | United Kingdom | |
| 1185633 | 3/1970 | United Kingdom | |
| 779156 | 11/1980 | U.S.S.R. | 403/370 |

OTHER PUBLICATIONS

Abstract of 3,276,287, Official Gazette, 10-4-66.

Primary Examiner—Allan D. Herrmann
Attorney, Agent, or Firm—Larry J. Palguta; Ken C. Decker

[57] ABSTRACT

A telescoping steering shaft includes a first shaft (16) having a polygonal-shaped bore (18) receiving for reciprocation therein a polygonal-shaped second shaft (12) having a tapered end (13). The polygonal-shaped second shaft (12) has a through axial opening (14) receiving a connecting rod (20) therein, the rod having a nut-shaped end (26) located adjacent the tapered end (13) of the second shaft (12) and the other end (15) being threaded to receive a lever (24) thereon. A collet nut (31) is mounted on the rod (20) adjacent the nut-shaped end (26) and has a plurality of axially extending projections (36) each including at least one surface (37 or 38) disposed parallel to an adjacent surface of the polygonal bore (18) and an interior axially inclined surface (35) disposed adjacent the tapered end (13). Rotation of the lever (24) about the rod (20) axially displaces the rod toward the lever which causes the inclined surfaces (35) of the projections (36) to engage the tapered end (13) and bias the projections (36) outwardly into engagement with the adjacent parallel surfaces of the bore (18), thereby eliminating torsional lash and axial movement between the shafts (12, 16).

3 Claims, 5 Drawing Figures

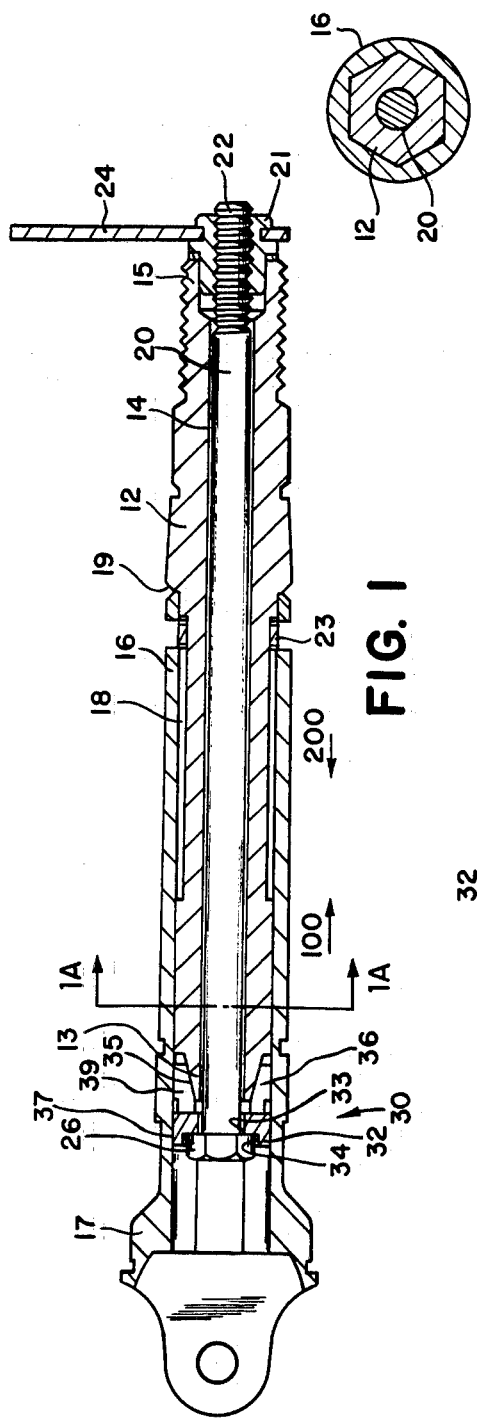

AXIAL POSITION LOCK FOR TELESCOPING STEERING COLUMN

This invention relates to an axial position lock for a telescoping steering column of an automotive vehicle. A telescoping steering shaft, when incorporated into the steering column of an automotive vehicle, makes it possible for the operator of the vehicle to move the steering wheel axially with respect to the steering column.

Most automotive vehicles are provided with an adjustable seat so that the driver can obtain a comfortable position with respect to the control pedals of the vehicle, as determined by the length of the driver's legs. However, if the steering column cannot also be adjusted, more likely than not the position of the steering wheel with respect to the pedals is unsatisfactory. Thus, a driver with long legs, after moving the seat rearward, may find the steering wheel too far away for comfort. On the other hand, a short-legged driver, after adjusting the seat to the forward position, may find that the steering wheel touches his body.

In the design of telescoping steering columns, prime consideration must be given to such features as lash-free steering shafts, smooth position change of the shafts, and simple, yet positive, locking and unlocking actuation. Runkle U.S. Pat. No. 3,434,368 issued Mar. 25, 1969 and entitled "No-Lash Axially Movable Steering Column", illustrates an early design of a telescoping steering column which utilizes two polygonal-shaped shafts. It is desirable to provide a telescoping steering column that is an improvement over prior telescoping steering columns, and which provides improved takeup of lash and smoother actuation for the locking and unlocking procedures.

The present invention provides a telescoping steering shaft which comprises a first shaft having a polygonal-shaped bore receiving for reciprocation therein a polygonal-shaped second shaft having a tapered end. The polygonal-shaped second shaft has a through-axial opening receiving a connecting rod therein, the rod having a nut-shaped end located adjacent the tapered end of the second shaft and the other end of the rod being threaded to receive an adjusting lever with a threaded opening therein. A collet nut is mounted on the rod adjacent the nut-shaped end and has a plurality of axially extending projections each including at least one surface disposed parallel to an adjacent surface of the polygonal bore and an interior axially inclined surface disposed adjacent the tapered end. Rotation of the adjusting lever about the rod displaces axially the rod toward the lever which causes the inclined surfaces of the projections to engage the tapered end and bias the projections outwardly into engagement with the adjacent parallel surfaces of the polygonal-shaped bore, thereby eliminating torsional lash and axial movement between the shafts.

Because the collet nut has a hexagonal outer shape with segmented expansion sections and a tapered inside diameter, the collet nut permits lash takeup in six directions and thus requires a very small amount of actuation for locking and unlocking. When eliminating excessive lash between the shafts of a telescoping steering column, it is important to prevent a great amount of lash from developing in any one direction. Excessive lash in one direction would allow the steering wheel to drop a small amount upon unlocking and negate any smooth position change. The positive locking and unlocking actuation movements of the present invention are the result of expanding simultaneously the hex-shaped collet nut in six directions. The locking force is evenly distributed to the six mating surfaces of the polygonal-shaped bore in which the telescoping shaft operates. The even distribution of the locking force minimizes wear and chances for brinelling.

An embodiment of the invention is described in detail below with reference to the accompanying drawings which illustrate the invention.

FIG. 1 is a sectional view of a portion of the steering column of the vehicle showing the axially movable components thereof in the mechanism incorporating the invention;

FIG. 1A is a section-view along view line 1A—1A of FIG. 1;

FIG. 2 is a section view of the collet nut of the present invention;

FIG. 3 is an end view along lines 3—3 of FIG. 2; and

FIG. 4 is an end view along view lines 4—4 of FIG. 2.

Referring to FIGS. 1-4, it can be seen that an axially movable shaft 12 having a hexagonal shape is located in a corresponding hexagonal bore 18 formed in a shaft 16. Shaft 12 is suitably connected at end 15 to the steering wheel (not shown) of a vehicle. End 17 of shaft 16 is suitably connected to the steering gear (not shown) of the vehicle through means of a universal joint. By telescoping shaft 12 within the polygonal-shaped bore 18 of shaft 16, it is apparent that axial adjustment of the vehicle steering wheel can be accomplished simply by pushing or pulling on the steering wheel. Furthermore, in the event of an accident, injury to the driver will be minimized because the steering column can telescope upon impact. The amount of relative axial movement between shafts 12 and 16 is limited by engagement of shoulder 19 of shaft 12 with a retainer 23.

Because it is impractical from a tolerance standpoint to make the telescoping shafts 12 and 16 entirely lash-free, the mechanism indicated generally by reference numeral 30 is utilized to maintain the two shafts in continuous frictional engagement at all times. Shaft 12 has an interior through longitudinal opening 14 receiving a rod 20 therein. Rod 20 has at one end a nut-shaped head 26 and at the opposite end a threaded end 22. Threaded end 22 receives thereon nut 21 and an actuation lever 24. Shaft 12 terminates in tapered end 13, the end 13 comprising a generally cone-shaped smooth surface. Mechanism 30 includes a hexagonal-shaped collet nut 31 having a central opening 33 therein. Collet nut 31 is mounted upon rod 20 such that a recess 34 of collet head 32 receives nut head 26 therein. The recess 34 is hexagonal shaped and receives complementary-shaped nut head 26 in order to effect joint rotational movement therebetween. Collet nut 31 comprises a plurality of projections 36 each having a pair of flat, radially exterior surfaces 37 and 38 disposed radially opposite an interior inclined and rounded surface 35. Each projection 36 is separated from an adjacent projection by means of an axial slot 39. Circumferential groove 41 effects flexibility so that the projection 36 may move radially. Rod 10 maintains inclined annular surfaces 35 of collet nut 31 in engagement with tapered end 13 such that projection surfaces 37, 38 continuously engage the associated surfaces of polygonal bore 18.

Operation of the mechanism is more clearly shown with reference to FIG. 1. In order to expand the projections 36 of collet nut 31 such that shaft 12 engages shaft 16 for continuous axial and rotational movement therewith, the adjusting lever 24 is rotated in a clockwise direction (looking from the right towards threaded end 22) which causes nut 21 to rotate about threaded end 22. Threaded end 22 is displaced axially towards the right and correspondingly displaces axially the rod 20 and nut head 26. Axial displacement of rod 20 in the direction of arrow 100 moves collet nut projections 36 into tighter engagement with tapered end 13 to bias projections 36 radially outwardly into tight engagement with the associated surfaces of polygonal bore 18. Thus, shaft 12 frictionally engages shaft 16 for continuous rotational and frictional engagement therewith. If it is desired to loosen the engagement of the shafts in order that the the interior shaft 12 may be adjusted axially relative to shaft 16, adjusting lever 24 and associated nut 21 are rotated counterclockwise which releases rod 20 for movement in the axial direction of arrow 200. Because collet nut 31 is subject to the biasing forces exerted by tapered end 13 on projections 36, rod 20 is axially displaced in the direction of arrow 200 and allows projections 36 to move radially inwardly. Axial movement of rod 20 in the direction of arrow 200 decreases the frictional engagement between projection surfaces 37, 38 and the associated surfaces of polygonal bore 18 such that shaft 12 may be moved axially relative to shaft 16. Upon accomplishing readjustment of the shafts, the adjusting lever 24 may then be rotated clockwise to retighten or relock the shafts relative to one another.

It is apparent from the above description that the locking force of mechanism 30 is evenly distributed to the six surfaces of polygonal bore 18 by means of the collet nut projections 36 which are expanded radially outwardly by engagement with tapered end 13. This permits the simultaneous takeup of lash in six directions, thereby requiring a very small amount of actuation or axial displacement during the locking and unlocking procedures. In addition to providing a lash-free telescoping steering column, there is provided both a smooth axial position change of the shafts and a simple, yet positive, locking and unlocking actuation mechanism. Because the locking force is evenly distributed to the six surfaces of polygonal bore 18, wear of the associated surfaces is minimal and the chances for brinelling is minimized.

It is contemplated that one skilled in the art could make many modifications and/or changes to the invention as described herein without deviation from the essence thereof. These modifications and or changes are intended to fall within the scope of the appended claims.

I claim:

1. A telescoping steering shaft, comprising a first elongated shaft defining an axially extending polygonal bore therein, a second elongated polygonal-shaped shaft received for reciprocation in said polygonal bore of the first shaft, the second shaft having a tapered annular end disposed within said bore and having an interior longitudinal opening, an elongated rod received in the interior longitudinal opening and having an enlarged diameter end disposed near said tapered annular end, and an axially movable member for causing rotation and continuous frictional engagement of one of said shafts with respect to the other of said shafts upon axial movement of said movable member in order to eliminate positively torsional lash and axial movement therebetween, said axially movable member having an opening receiving said rod therein and the movable member engaging said enlarged diameter end, the movable member including multi-surface expansion portions comprising a plurality of axially extending projections each with outer surfaces parallel to adjacent surfaces of the polygonal bore and an axially inclined surface disposed parallel to the tapered end, so that axial displacement of the axially movable member effects engagement of the inclined surfaces with said tapered end to bias said projections radially outwardly into positive locking engagement with said adjacent surfaces of the bore, said axially movable member comprising a collet nut and the plurality of axially extending projections defined between oppositely disposed axial slot openings of said collet nut, a recess disposed within an end of said collet nut, the recess receiving the enlarged diameter end therein in order to effect joint rotational movement therebetween, and a circumferential groove disposed in the collet nut and located axially between said end of the collet nut and the axially extending projections in order to provide flexibility for radial movement of the projections.

2. The telescoping steering shaft, in accordance with claim 1, wherein said elongated rod includes a threaded end receiving a lever thereon, the lever rotatable to effect axial displacement of said axially movable member.

3. The telescoping steering shaft, in accordance with claim 1, wherein said tapered end is substantially cone-shaped.

* * * * *